(12) United States Patent
Rauch

(10) Patent No.: US 8,777,622 B2
(45) Date of Patent: Jul. 15, 2014

(54) ON-BOARD TRAINING MODE FOR MOBILE EQUIPMENT

(75) Inventor: Brian Joseph Rauch, Dubuque, IA (US)

(73) Assignee: Deere & Company, Moline, IL (US)

( * ) Notice: Subject to any disclaimer, the term of this patent is extended or adjusted under 35 U.S.C. 154(b) by 2669 days.

(21) Appl. No.: 11/511,187

(22) Filed: Aug. 28, 2006

(65) Prior Publication Data

US 2008/0070227 A1  Mar. 20, 2008

(51) Int. Cl.
*G09B 9/04* (2006.01)

(52) U.S. Cl.
USPC ............................... 434/66; 434/379

(58) Field of Classification Search
USPC .................................... 434/66, 379
See application file for complete search history.

(56) References Cited

U.S. PATENT DOCUMENTS

| 5,646,844 A | 7/1997 | Gudat et al. |
| 6,856,878 B2 | 2/2005 | Braunhardt et al. |
| D514,596 S | 2/2006 | Radke |
| 2003/0231199 A1* | 12/2003 | Beam, III ..................... 345/709 |
| 2006/0113121 A1* | 6/2006 | Radke et al. ................ 180/9.44 |
| 2008/0091520 A1 | 4/2008 | Hatori et al. |

FOREIGN PATENT DOCUMENTS

WO  2006015592  2/2006

OTHER PUBLICATIONS

John Deere, Simulator—Operator Training in a Classroom, 1 page, Copyright 1996-2006, available at least as early as Aug. 3, 2006.
John Deere, Timbermatic Brochure, 16 pages, available at least as early as Aug. 3, 2006.
Komatsu D155AX-6 Crawler Dozer, Apr. 2006, 16 pages.
European Patent Office, Extended European Search Report for corresponding European Application No. 07253335, Dec. 3, 2012, 8 pages.

* cited by examiner

*Primary Examiner* — Sam Yao
*Assistant Examiner* — Evan Page
(74) *Attorney, Agent, or Firm* — Faegre Baker Daniels LLP

(57) ABSTRACT

A mobile vehicle is disclosed which includes an on-board training system.

27 Claims, 9 Drawing Sheets

ON-BOARD TRAINING MODE FOR MOBILE EQUIPMENT

BACKGROUND OF THE INVENTION

The present invention relates generally to a training system for a mobile vehicle. More particularly, the present invention relates to a training system that is provided with the mobile vehicle.

Mobile vehicles, such as off-highway equipment, are becoming increasingly sophisticated and complex. For example, electronics permit different modes of actuation for a particular function of the vehicle and the addition of new functions to the vehicle. It is important to train operators to use such capabilities in order to be able to utilize more completely the full potential of the equipment.

Traditionally training of operators has been accomplished through operator manuals, brief demonstrations, and the use of simulators in a classroom environment. This may lead to training gaps for new employees based on the availability of experienced operators. Further, operators are not trained on some specific functions unless the circumstances are available that require the specific function, such as adjustments on differential slip or timing on clutch cut-offs.

SUMMARY OF THE INVENTION

In an exemplary embodiment of the present invention, training on an operation of a mobile vehicle is provided.

In another exemplary embodiment of the present invention, a mobile vehicle is provided. The mobile vehicle comprising a chassis, a traction device adapted to contact the ground and propel the chassis; a productive device which is operable to perform at least one function; an input device which is actuatable to control the productive device; a control system configured to operate the productive device in response to an actuation of the input device; and a controller operably coupled to the control system. The controller being configurable in at least an operational mode wherein the productive device is enabled to perform a first task in response to the actuation of the input device and in a training mode wherein the productive device is disabled to perform the first task.

In a further exemplary embodiment of the present invention, a mobile vehicle is provided. The mobile vehicle comprising a chassis, a traction device adapted to contact the ground and propel the chassis; a power device operably coupled to the traction device; at least one productive device which is operable to perform at least one function through at least one input device; and a computer system supported by the chassis. The computer system including a display and a user input device. The computer system configured to present an interactive training session. The at least one productive device being disabled during the training session.

In yet another exemplary embodiment of the present invention, a method of training an operator of a mobile vehicle is provided. The method comprising the steps of providing a mobile vehicle. The mobile vehicle including a chassis, a traction device adapted to contact the ground and propel the chassis, a power device, and a drive device being coupled to the power device and the traction device to provide power to the traction device. The mobile vehicle further including at least one productive device which is operable to perform at least a first task through at least one input device. The method further comprising the steps of providing an interactive computer system coupled to the mobile vehicle, the interactive computer system including a training program to train the operator; selecting the training program; and disabling the at least one productive device during the training program.

In yet a further exemplary embodiment of the present invention, a method of training an operator of a mobile vehicle is provided. The method comprising the steps of: providing a mobile vehicle; wirelessly communicating an indication of a completion of the training program to a remote device; and storing a record of the completion of the training program. The mobile vehicle including at least one productive device and an interactive training program to train an operator of the mobile vehicle.

Additional features of the present invention will become apparent to those skilled in the art upon consideration of the following detailed description of the presently perceived best mode of carrying out the invention.

BRIEF DESCRIPTION OF THE DRAWINGS

The detailed description of the drawings particularly refers to the accompanying figures in which.

DETAILED DESCRIPTION OF THE DRAWINGS

Figure 1:
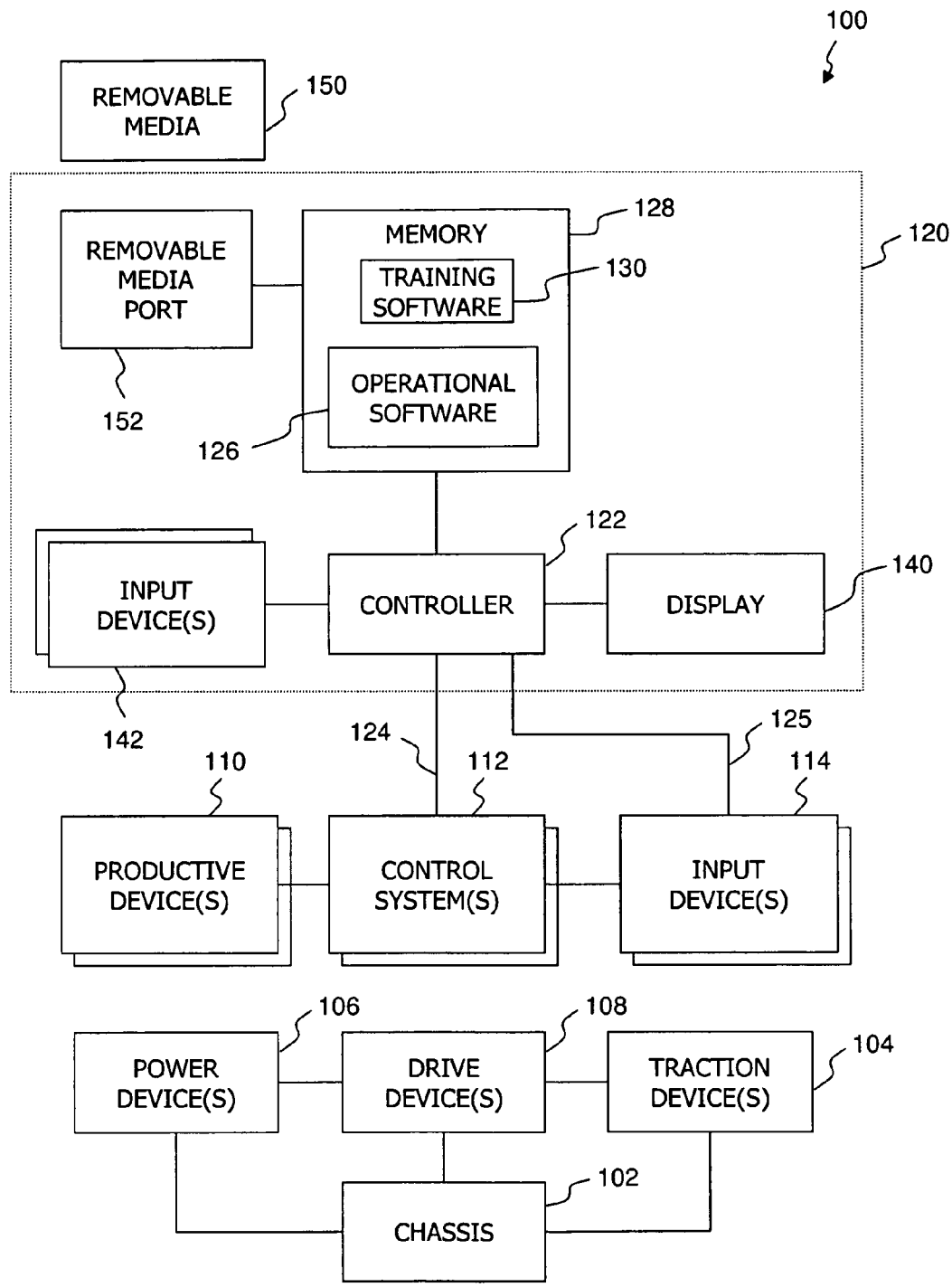
FIG. 1 is a representation of a portion of an exemplary mobile vehicle, including training software and operational software.

Referring to FIG. 1, a representation of a mobile vehicle 100 is disclosed. Mobile vehicle 100 includes a chassis 102 and one or more traction devices 104 which engage the ground to propel vehicle 100 relative to the ground. In one embodiment, chassis 102 includes a first portion and a second portion which are moveably coupled about an articulated joint. Exemplary traction devices 104 include wheels and track systems including an endless track. Exemplary mobile vehicles include construction equipment, such as backhoes, crawler loaders, and crawler dozers, forestry equipment, such as harvesters, and agricultural equipment.

Traction devices 104 are coupled to a power device 106 through one or more drive devices 108. Power device 106 provides power to traction devices 104 to propel vehicle 100. Exemplary power devices 106 include engines, such as an internal combustion engine. Exemplary drive devices 108 include transmissions and differentials.

Vehicle 100 further includes one or more productive devices 110. As used herein, the term productive device means a device which is used to engage objects in the environment that the vehicle is placed, such objects including soil, rocks, trees, and any other objects in the environment. Exemplary productive devices include blades for dozers, buckets for loaders, booms and cutting heads for harvesters, and backhoes and buckets for backhoe loaders.

Productive devices 110 are controlled by one or more control systems 112. Exemplary control systems include one or more of hydraulic systems, pneumatic systems, mechanical systems, electrical systems, and/or other suitable systems. An operator of vehicle 100 controls the operation of control systems 112 through one or more input devices 114. Exemplary input devices 114 include levers, buttons, dials, joysticks, pedals, and other suitable input devices.

In one embodiment, the operation of control systems 112 is controlled through a computer system 120. As shown in FIG. 1, control system 112 and input devices 114 are each operably coupled to a controller 122 of computer system 120, as represented by respective connections 124 and 125. Controller 122 is configured to operate in an operational mode and a training mode.

When in an operational mode, operational software 126 stored in memory 128 is executed by controller 122. Operational software 126, in one embodiment, at least configures controller 122 to enable the use of productive devices 110 based on actuations of input devices 114. In one embodiment, the use of productive devices 110 is enabled by the enablement of control system 112 by controller 122. When in a training mode, training software 130 stored in memory 128 is executed by controller 122. Training software 130, in one embodiment, at least configures controller 122 to disable the use of productive devices 110. In one embodiment, productive devices 110 do not move in response to actuations of input devices 114 by an operator, and are thereby disabled.

Computer system 120 further includes a display 140. In one embodiment, controller 122 provides instructions to present on display 140 at least training information during the training mode and at least operational information during the operational mode. An operator may activate either the training mode or the operational mode through one or more user input devices 142. Exemplary user input devices include buttons, touch sensitive regions, a keyboard, a mouse, and other suitable user input devices. In one embodiment, an input device 142 also serves as an input device 114.

In one embodiment, updates to operational software 126 or training software 130 are loaded into memory 128 from a removable media 150, such as a USB (universal serial bus) memory device, a floppy, a compact disc, or other suitable computer readable media. Removable media 150 is coupled to a removable media port 152 of computer system 120. In one embodiment, removable media port 152 is a USB port and removable media 150 is a USB memory device. Further, removable media port 152 may be used to retrieve information from memory 128, such as an indication of the training sessions completed through training software 130.

Figure 2:
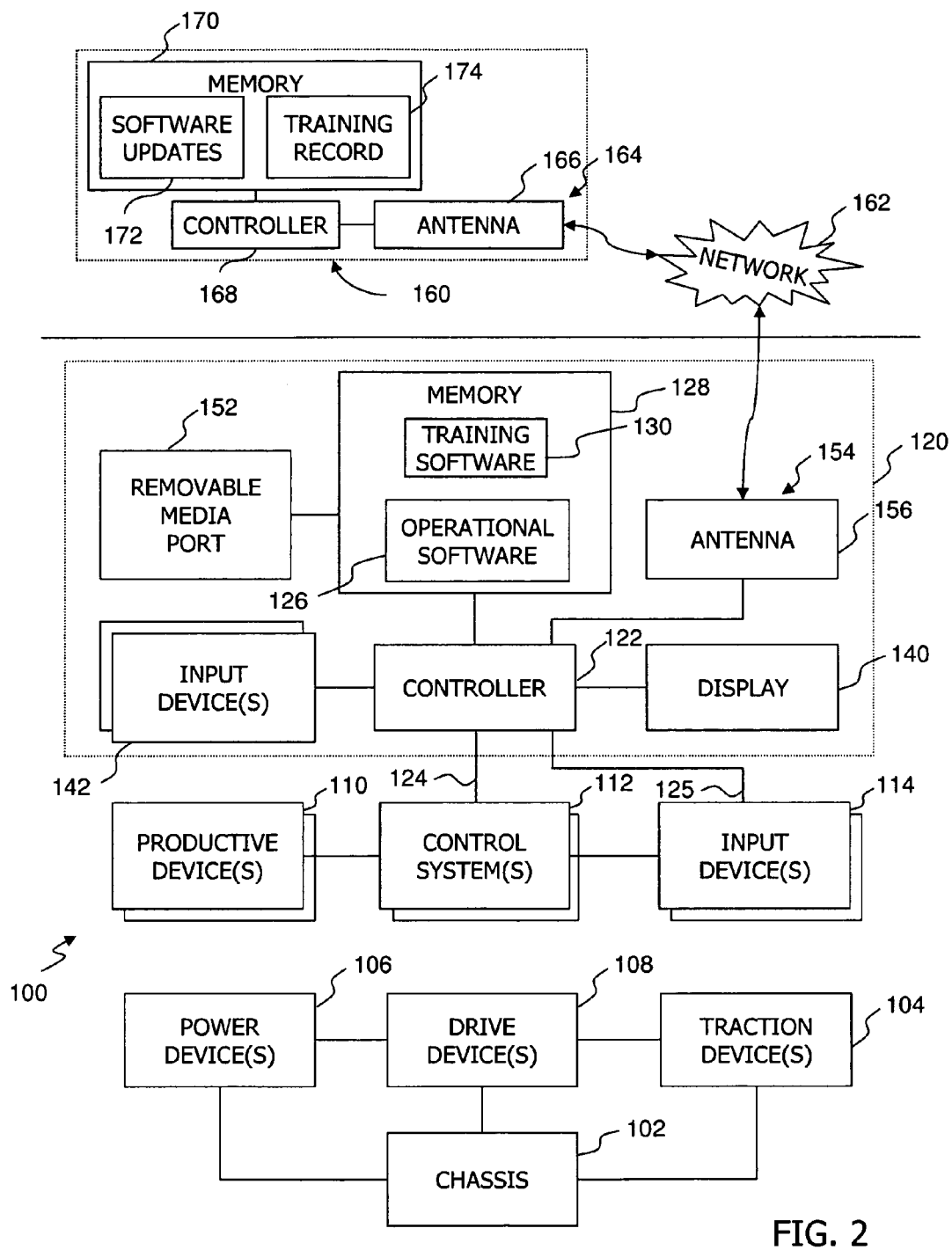
FIG. 2 is a representation of an embodiment of the exemplary mobile vehicle of FIG. 1 communicating over a network with a remote device.

Referring to FIG. 2, in one embodiment, computer system 120 of mobile vehicle 100 communicates with one or more remote devices 160 over a network 162. In the illustrated embodiment wherein network 162 is a wireless network, computer system 120 of mobile vehicle 100 includes a connector 154 to network 162, illustratively an antenna 156. Antenna 156 is configured to send and receive data over network 162 as is known in the art. Exemplary wireless networks include local wireless networks such as wi-fi and Bluetooth or wider area networks such as cellular networks, satellite networks, and other suitable networks.

Remote device 160 also includes a connector 164 to network 162, illustratively an antenna 166. Antenna 166 like antenna 156 is configured to send and receive data over network 162. Remote device 160 further includes a controller 168 which has access to a memory 170. Memory 170 has stored thereon at least software updates 172, including updates to operational software 126 and/or updates to training software 130, and a training record 174. Memory 170 is illustrated as being apart of remote device 160. However, memory 170 may be located at another location and is accessible by controller 168, such as through a wired or wireless network, including a local area network, a wide area network, or the Internet.

In one embodiment, an organization may have vehicles 100 at various remote locations and/or a large number of potential operators. In one example, the organization has a plurality of operators of varying skill levels. The organization desires to make sure that each operator of vehicle 100 is properly trained on the operation of vehicle 100. As such, vehicle 100 when located at a first location may need to communicate with a remote device 160 located at a location remote from the first location. An operator of vehicle 100 interacts with training software 130 of vehicle 100 which provides an indication of the successful completion of various training sessions. These indications are provided to remote device 160 over network 162 which stores the indications in a training record that corresponds to vehicle 100. In one embodiment, at least one function of vehicle 100 is disabled until a given training session on the at least one function has been completed. In one embodiment, the organization is a rental company which rents vehicle 100.

In one embodiment, training software 130 is stored at remote device 160 and is accessible through network 162, such as the assessing of one or more web pages in an embodiment wherein network 162 permits access to the Internet.

Figure 3:
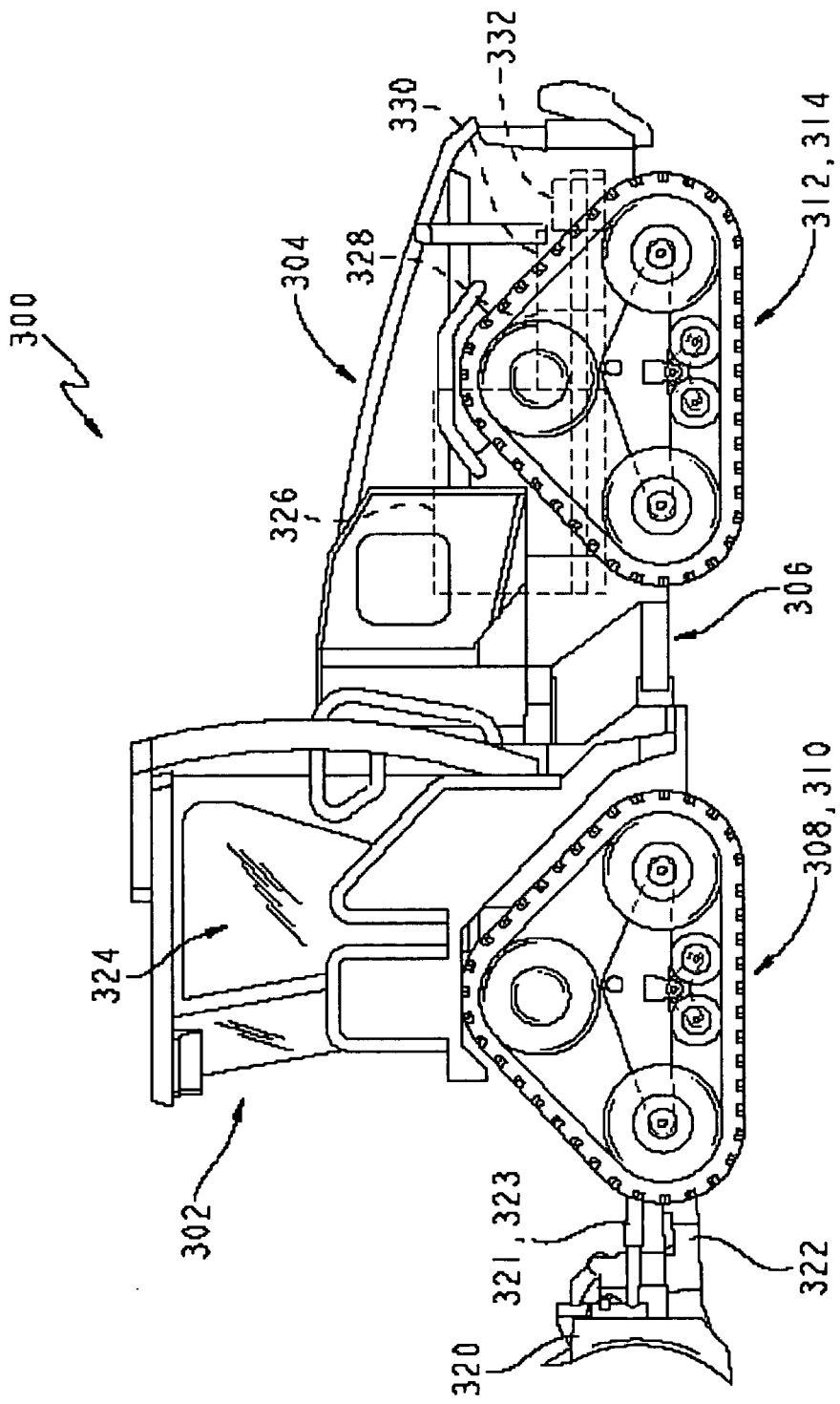
FIG. 3 is a side view of an exemplary mobile vehicle, an articulated crawler vehicle.

Referring to FIG. 3, an exemplary mobile vehicle 300 is shown. Vehicle 300 is a four track articulated dozer having a front portion 302, a rear portion 304, a conventional articulation mechanism 306 between the front portion 302 and the rear portion 304, first and second track systems 308, 310 (on opposite side), and third and fourth track systems 312, 314 (on opposite side). Front portion 302 includes a blade 320 and a blade mounting frame 322. Further, front portion 302 includes an operator cab 324. The position of blade 320 is at least controlled through hydraulic actuators 321, 323 (on opposite side).

The rear portion 304 includes an engine 326, a first hydrostatic pump 328 operatively connected to the engine, a second hydrostatic pump 330 operatively connected to the first hydrostatic pump 328, and a third hydraulic pump 332 operatively connected to the second hydraulic pump 330. Additional details regarding vehicle 300 are provided in U.S. patent application Ser. No. 11/286,731, filed Nov. 23, 2005, published as US Published Application No. 2006/0013121, the disclosure of which is expressly incorporated by reference herein.

Figure 4:
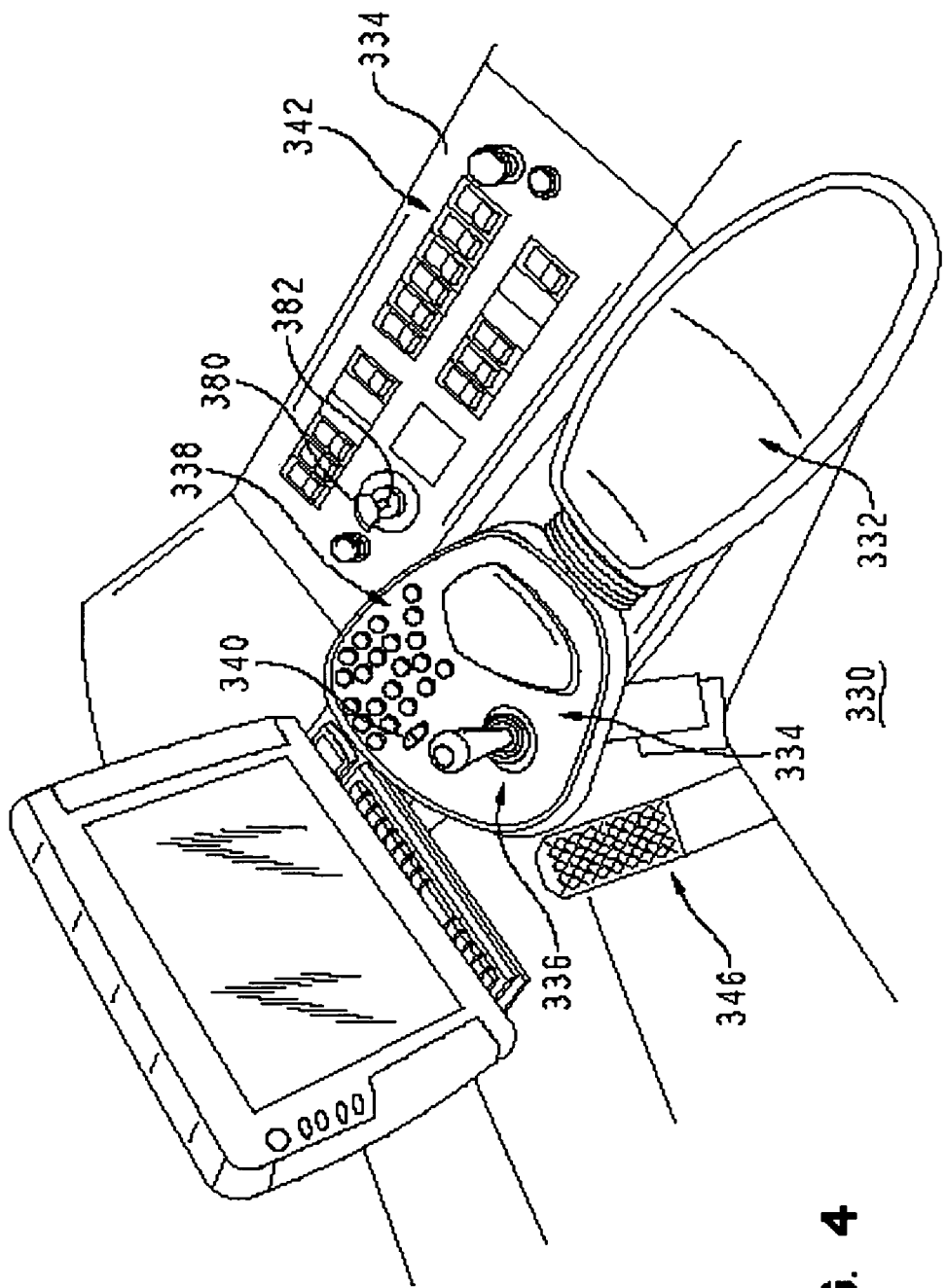
FIG. 4 is an isometric view of a portion of an operator station within an exemplary mobile vehicle.

In one embodiment, operator cab 324 includes an operator seat, one or more user inputs, such as a joystick, and a computer system, such as computer system 120. An exemplary interior for an operator cab 324 is shown in FIG. 4. The arrangement shown in FIG. 4 corresponds to a harvester vehicle for use in the forestry industry, but is generally applicable to vehicle 300 as well. Referring to FIG. 4, an operator seat 330 is shown. Coupled to seat 330 is an arm rest 332 and a hand rest 334. A joystick 336 is shown coupled to and extending out of hand rest 334. Joystick 336 is one example of an input device 114. In one embodiment, joystick 336 is configured to provide an input to control a productive device 110, such as blade 320. Additional exemplary input devices 114 are also shown in FIG. 4 and include buttons 338 on hand rest 334, switch 340 on hand rest 334, switches 342 on side console 344, and pedals 346 below operator seat 330.

Figure 5:
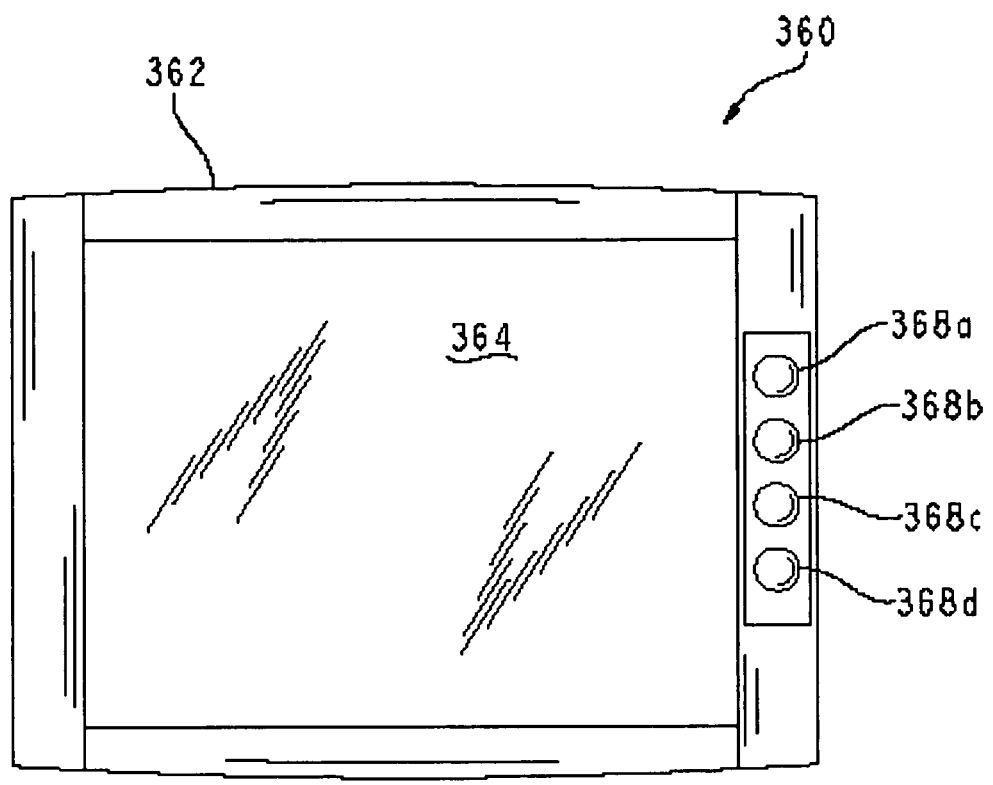
FIG. 5 is a front view of an exemplary display for the operator station of FIG. 4.

Referring to FIG. 5, an exemplary display 360 is illustrated. Display 360 includes a housing 362 and a display screen 364. Display screen 364 is configured to communicate at least operational information when controller 122 is in an operational mode executing operational software 126 and to communicate at least training information when controller 122 is in a training mode executing training software 130. In one embodiment, exemplary operational software and displayed operational information is provided as part of the Timbermatic system available for forestry equipment from Deere and Company located in Moline, Ill.

Exemplary operational information includes representations of indicator lights, representations of gauges, and textual information such as engine rpm. Exemplary indicator lights include an engine preheat indicator, a check service code indicator, a brake pressure indicator, a coolant level indicator, a coolant temperature indicator, a park brake indicator, and a differential lock indicator. Exemplary gauges include a coolant temperature gauge, a hydraulic fluid temperature gauge, an engine oil pressure gauge, a transmission oil temperature gauge, and a fuel gauge. Further, display screen 364 may display multiple different screens of operational information. In one embodiment, display screen 364 may display information about a productive device 110, such as blade 320 for vehicle 300. Exemplary information includes a position of blade 320, a percentage of cross slope, and a percentage of vehicle pitch.

Exemplary training information includes graphic and textual information related to the operation of vehicle 100. Further, exemplary training information may include video segments and/or audio segments.

Display 360 further includes user input devices 368A-D. Illustratively, user input devices 368A-D are shown as buttons. Alternatively, user input devices 368A-D may be dials, sliders, touch areas, and/or selectable regions of display screen 364. In one embodiment, user input device 368A corresponds to a menu function whereby a menu of options are presented on display screen 364; user input device 368D corresponds to a select function whereby a currently highlighted option may be selected; and user input devices 368B and 368C correspond to respective previous and next inputs whereby the currently highlighted option may be changed to another option.

Figure 6A:
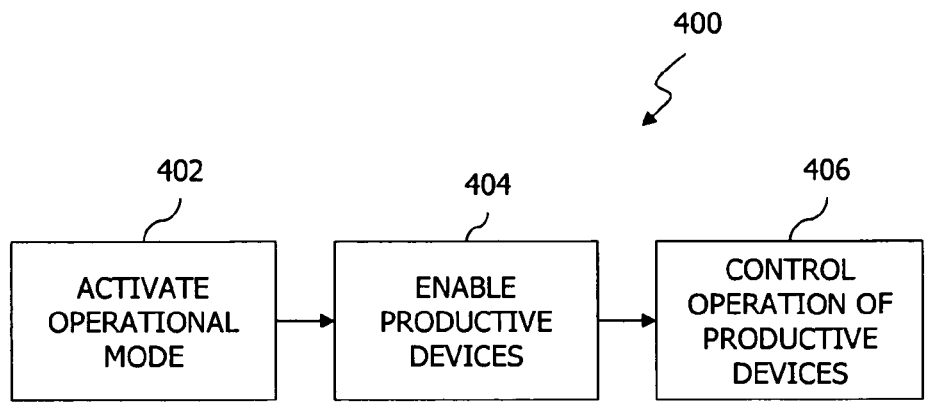
FIG. 6A is a representation of an exemplary operational mode.

Referring to FIG. 6A, a representation of an exemplary operational mode 400 is shown wherein controller 122 is executing operational software 126. The operational mode 400 is activated, as represented by block 402. In one embodiment, the operational mode 400 is activated in response to a check to make sure that the appropriate training of the training mode 410 has been completed. When in operational mode 400, controller 122 enables productive devices 110 as represented by block 404. As such, an operator of vehicle 100 may request one or more functions be performed with productive devices 110 through the actuation of input devices 114 and/or 142, such as the upward movement of blade 320 of vehicle 300. Further, controller 122 controls the operation of productive devices 110 based on operator inputs with input devices 114 and/or input devices 142, as represented by block 406.

Figure 6B:
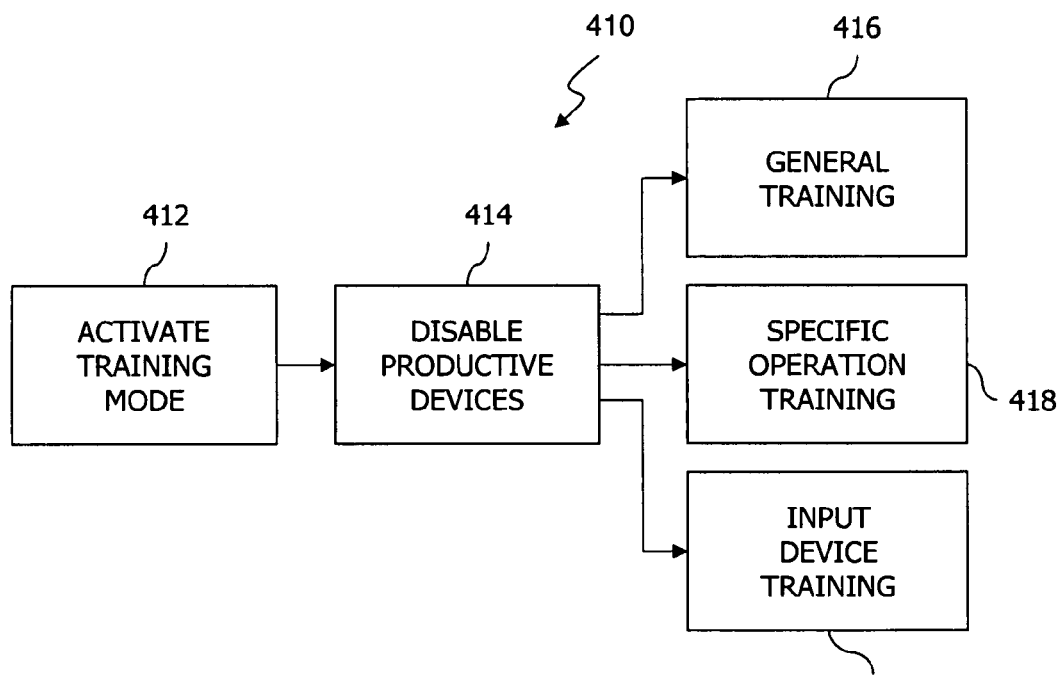
FIG. 6B is a representation of an exemplary training mode.

Referring to FIG. 6B, a representation of an exemplary training mode 410 is shown. Controller 122 activates training mode 410 as represented by block 412. In one embodiment, training mode 410 is activated in response to a user request to activate training mode 410. In one embodiment, a user requests activation of the training mode 410 by turning a key 380 positioned in a keyway 382 to an accessories position, as opposed to an off or run position. In one embodiment, training mode 410 is activated based upon an indication that training mode 410 has not been previously completed. Controller 122 executes training software 130 during training mode 410. During training mode 410, controller 122 disables the use of productive devices 110, as represented by block 414.

Further, controller 122 presents to the operator a training session which provides training information on operation of vehicle 100. Exemplary training sessions include general training, as represented by block 410, specific operation training, as represented by block 418, and input device training, as represented by block 420. In one embodiment, general training 416 includes training information on a general operation of vehicle 100. Further, general training 416 may include a list of items to be performed prior to and/or during start-up of vehicle 100 and/or a list of items to be performed during and/or after shutdown of vehicle 100. For instance, start-up information may refer the operator to decals positioned around vehicle 100 and/or provide video segments demonstrating steps to perform. In one embodiment, specific operation training 418 provides information on a specific task to be performed with a productive device 110. In one embodiment, input device training provides information on a given input device 114 and/or 142. For example, the function or functions controlled by the input device would be described and any available adjustments would be described. It should be understood that training software 130 may contain multiple general training sessions, specific training sessions, and/or user input training sessions.

In one embodiment, one or more of the training sessions provided are strictly instructional training sessions which do not require user input during the training session. In one example, the training session includes a video segment and/or audio segment.

Figure 7:
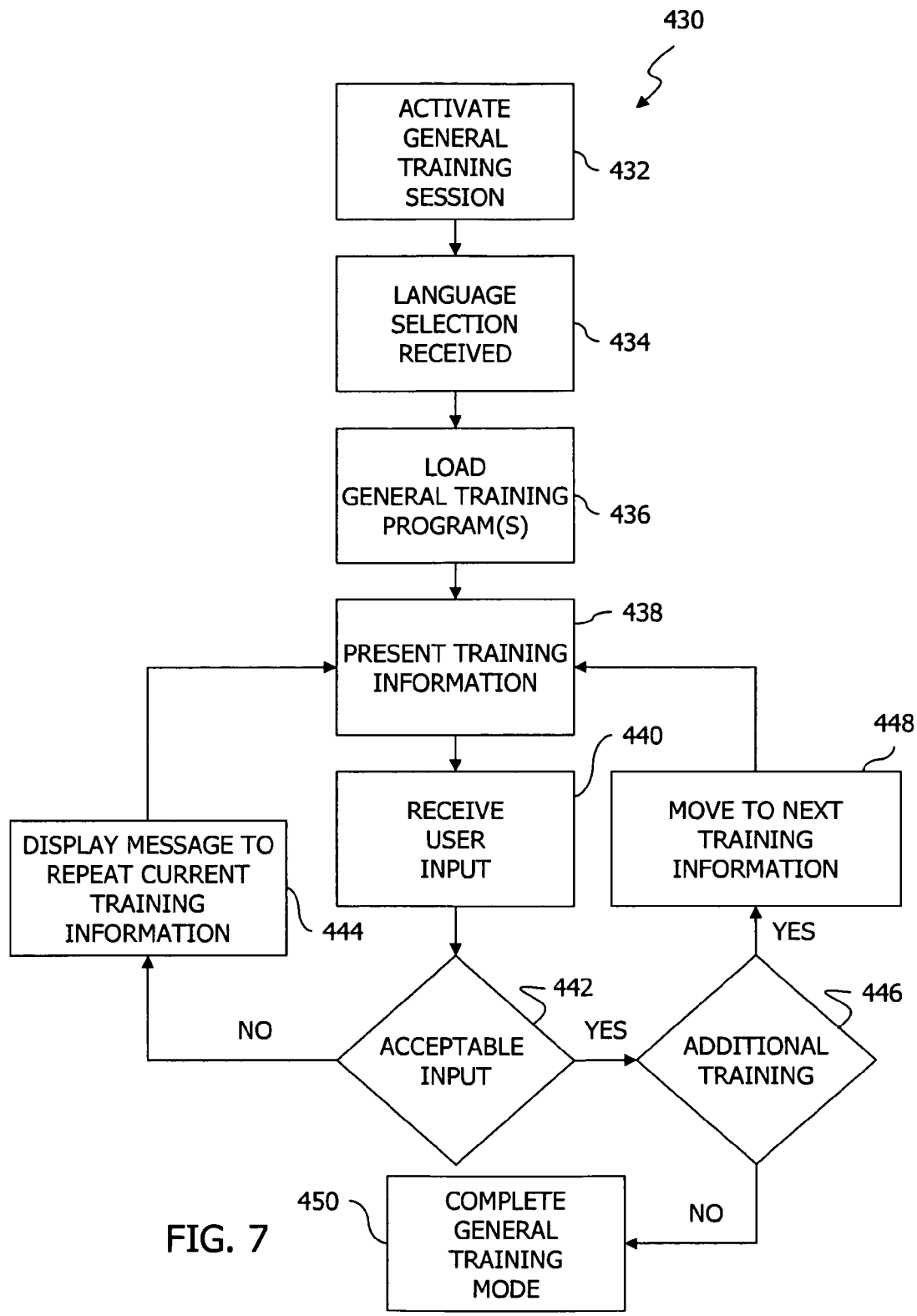
FIG. 7 is a flowchart of an exemplary general training session.

Referring to FIG. 7, an exemplary general training session 430 is illustrated. A general training session is activated, as represented by block 432. In one embodiment, the general training session is activated based upon an operator request, such as a selection with one or more of inputs 368A-D. In one embodiment, training information is presented in a plurality of languages. A language selection is received, as represented by block 434. In one embodiment, the desired language is selected with a user input 142. If not already loaded, controller 122 loads the general training software of training software 130 necessary for the training session, as represented by block 436. Controller 122 then provides instructions to display 140 to present training information to the operator, as represented by block 438. In one embodiment, a video segment is presented for the training information. The video segment along with additional video segments, if necessary, describe the general operation of vehicle 100 and which user inputs 114 to actuate to perform the general operation.

User input is received relative to the presented training information, as represented by block 440. The user input may simply be a request to advance to the next screen, if any, or may require a specific input, such as an actuation of a specific input device 114.

A determination is made whether the received user input is correct or incorrect, as represented by block 442. If the received user input is incorrect a message is displayed on display 140 to inform the operator that the received input was incorrect and that portion of the training session is to be repeated, as represented by block 444. The user is then again presented with training information as represented by block 438. In one embodiment, the user is allowed to proceed even if the received input is incorrect. In one example, the user is notified of the incorrect user input.

If the received user input is correct, then a determination is made whether additional training is provided as part of the general training session 430, as represented by block 446. If additional training is provided, then controller 122 determines what training information is next to be presented, as represented by block 448. The subsequent training information is then presented to the operator as represented by block 438. This cycle is repeated until no additional training information is provided and the operator has successfully completed their training. Once no additional training information is provided then the general training session is completed, as represented by block 450.

Figure 8:
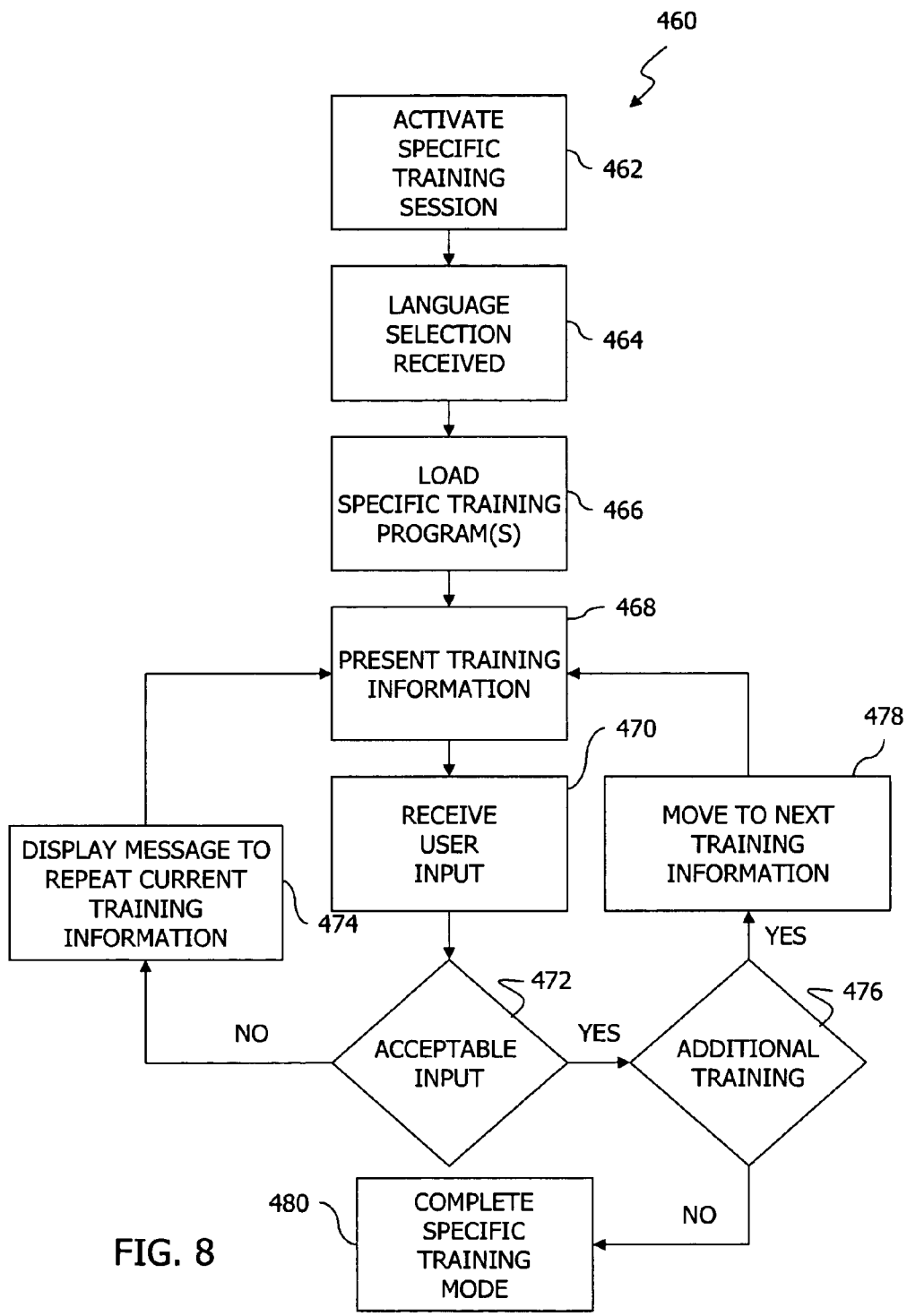
FIG. 8 is a flowchart of an exemplary specific training session.

Referring to FIG. 8, an exemplary specific training session 460 is illustrated. A specific training session is activated, as represented by block 462. In one embodiment, the specific training session is activated based upon an operator request, such as a selection with one or more of inputs 368A-D. In one embodiment, training information is presented in a plurality of languages. A language selection is received, as represented by block 464. In one embodiment, the desired language is selected with a user input 142. If not already loaded, controller 122 loads the specific training software of training software 130 necessary for the training session, as represented by block 466. Controller 122 then provides instructions to display 140 to present training information to the operator, as represented by block 468. In one embodiment, a video segment is presented for the training information. The video segment along with additional video segments, if necessary, describe the manner to perform the desired specific operation and which user inputs 114 to actuate to perform the desired specific operation.

User input is received relative to the presented training information, as represented by block 470. The user input may simply be a request to advance to the next screen, if any, or may require a specific input, such as an actuation of a specific input device 114.

A determination is made whether the received user input is correct or incorrect, as represented by block 472. If the received user input is incorrect a message is displayed on display 140 to inform the operator that the received input was incorrect and that portion of the training session is to be repeated, as represented by block 474. The user is then again presented with training information as represented by block 468.

If the received user input is correct, then a determination is made whether additional training is provided as part of the specific training session 460, as represented by block 476. If additional training is provided, then controller 122 determines what training information is next to be presented, as represented by block 478. The subsequent training information is then presented to the operator as represented by block 468. This cycle is repeated until no additional training information is provided and the operator has successfully completed their training. Once no additional training information is provided then the specific training session is completed, as represented by block 480.

Figure 9:
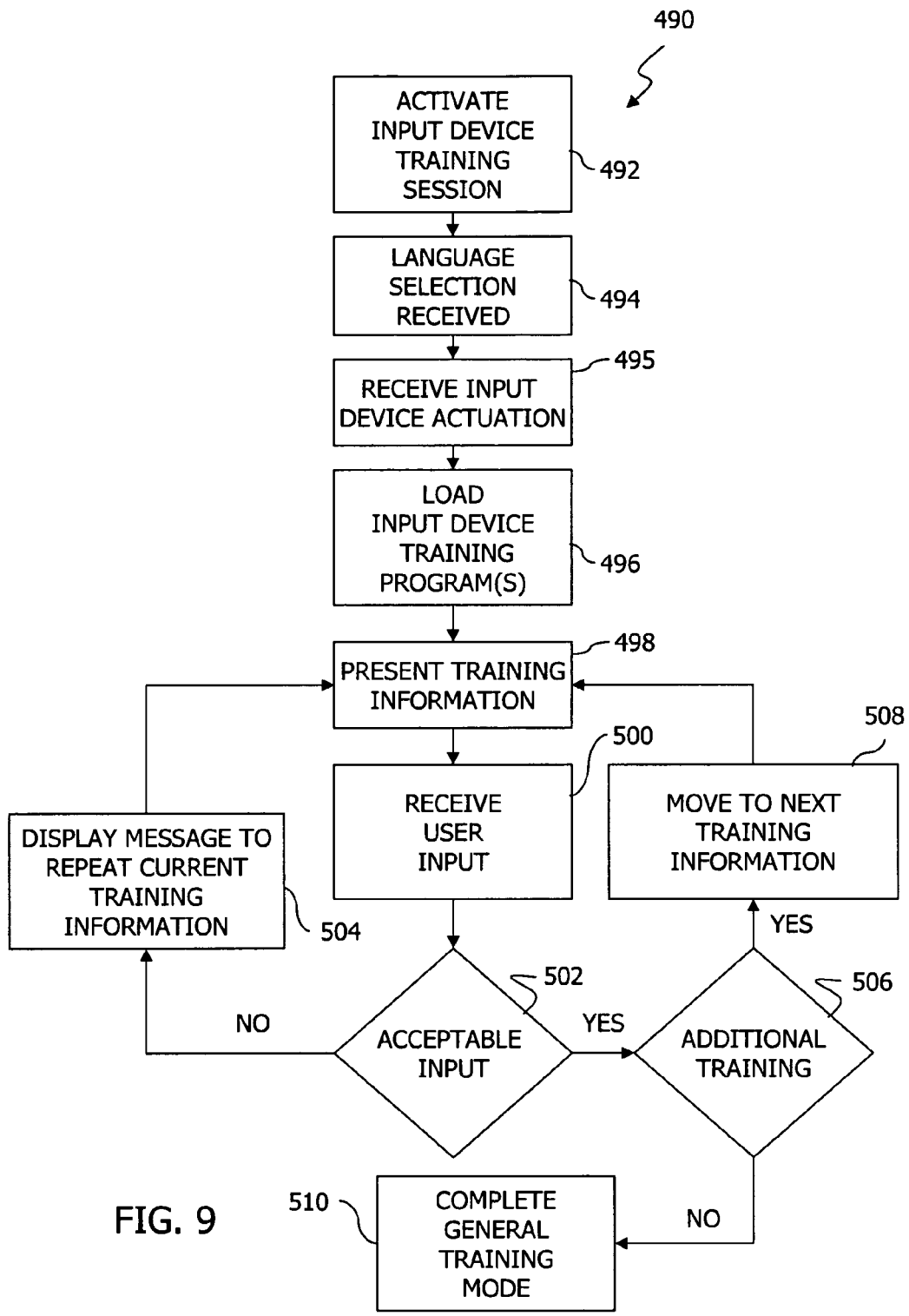
FIG. 9 is a flowchart of an exemplary input device training session.

Referring to FIG. 9, an exemplary input device training session 490 is illustrated. An input device training session is activated, as represented by block 492. In one embodiment, the input device training session is activated based upon an operator request, such as a selection with one or more of inputs 368A-D. In one embodiment, training information is presented in a plurality of languages. A language selection is received, as represented by block 494. In one embodiment, the desired language is selected with a user input 142. In one example, the user input training session describes the usage of a function performed by an input device with one or more of text, graphics, video segments, and/or audio segments. The information is provided in response to actuation of the input device Further, the operator selects a user input 114 to have training on by actuating the user input, as represented by block 495. If not already loaded, controller 122 loads the input device training software of training software 130 necessary for the training session, as represented by block 496. Controller 122 then provides instructions to display 140 to present training information to the operator, as represented by block 498. In one embodiment, a video segment is presented for the training information discussing the function of the selected user input 114 and available adjustments.

User input is received relative to the presented training information, as represented by block 500. The user input may simply be a request to advance to the next screen, if any, or may require a specific input, such as an actuation of a specific input device 114.

A determination is made whether the received user input is correct or incorrect, as represented by block 502. If the received user input is incorrect a message is displayed on display 140 to inform the operator that the received input was incorrect and that portion of the training session is to be repeated, as represented by block 504. The user is then again presented with training information as represented by block 498.

If the received user input is correct, then a determination is made whether additional training is provided as part of the input device training session 490, as represented by block 506. If additional training is provided, then controller 122 determines what training information is next to be presented, as represented by block 508. The subsequent training information is then presented to the operator as represented by block 498. This cycle is repeated until no additional training information is provided and the operator has successfully completed their training. Once no additional training information is provided then the input device training session is completed, as represented by block 510.

Although the invention has been described in detail with reference to certain preferred embodiments, variations and modifications exist within the spirit and scope of the invention as described and defined in the following claims.

The invention claimed is:

1. A mobile vehicle, comprising
   a chassis;
   a traction device adapted to contact the ground and propel the chassis;
   a productive device which is operable to perform at least one function;
   an input device which is actuatable to control the productive device;
   a control system configured to operate the productive device in response to an actuation of the input device; and
   a controller operably coupled to the control system, the controller being configurable in at least an operational mode wherein the productive device is enabled to perform a first task in response to the actuation of the input device and in a training mode wherein the productive device is disabled to perform the first task in response to the actuation of the input device, the controller evaluating the actuation of the input device in the training mode.

2. The mobile vehicle of claim 1, wherein the controller is operably coupled to a display and a user input, the display presenting training information when the controller is configured in the training mode and operational information when the controller is configured in the operational mode.

3. The mobile vehicle of claim 1, wherein the training mode includes at least one of a general training portion, a specific operation training portion, and an input device training portion, wherein the general training portion includes training information on a general operation of the mobile vehicle, the specific operation training portion includes information on a specific task to be performed with the productive device, and the input device training portion includes training information on the input device.

4. The mobile vehicle of claim 3, wherein the training mode includes the general training portion, the specific operation training portion, and the input device training portion.

5. The mobile vehicle of claim 3, wherein the controller in the general training portion presents a first segment of training information on a display operably coupled to the controller; requests an actuation of the input device; and determines whether a received indication of an actuation corresponds with the requested actuation, wherein the controller in the general training portion presents a second segment of training information on the display if the received actuation corresponds with the requested actuation and presents the first segment of training information on the display if the received actuation does not correspond with the requested actuation.

6. The mobile vehicle of claim 3, wherein the controller in the specific operation training portion presents a first segment of training information corresponding to the specific operation on a display operably coupled to the controller; requests an actuation of the input device; and determines whether a received indication of an actuation corresponds with the requested actuation, wherein the controller presents a second segment of training information corresponding to the specific operation on the display if the received actuation corresponds with the requested actuation and presents the first segment of training information corresponding to the specific operation on the display if the received actuation does not correspond with the requested actuation.

7. The mobile vehicle of claim 3, wherein the controller in the input device training portion receives an indication of an actuation of the input device and in response thereto presents on a display operably coupled to the controller training information regarding the input device.

8. The mobile vehicle of claim 3, wherein the at least one of a general training portion, a specific operation training portion, and an input device training portion are provided as instructions stored in a computer readable medium accessible by the controller.

9. The mobile vehicle of claim 8, further comprising a connector to a wireless network, the controller being configured to send information to and receive information from a remote device across the wireless network, the controller at least receiving an update to the at least one of a general training portion, a specific operation training portion, and an input device training portion across the wireless network.

10. The mobile vehicle of claim 8, further comprising a connector to a wireless network, the controller being configured to send information to and receive information from a remote device across the wireless network, the controller at least providing an indication of the completion of the at least one of a general training portion, a specific operation training portion, and an input device training portion across the wireless network.

11. The mobile vehicle of claim 1, wherein the productive device includes one of a blade, a bucket, a cutting head, and a backhoe, and wherein the input device includes one of a lever, a button, a dial, a joystick, and a pedal.

12. A mobile vehicle, comprising
a chassis;
a traction device adapted to contact the ground and propel the chassis;
a power device operably coupled to the traction device;
at least one productive device which is operable to perform at least one function through at least one input device; and
a computer system supported by the chassis and including a display and a user input device, the computer system configured to present an interactive training session, the computer system communicating with the at least one input device during the training session and the at least one productive device being disabled during the training session such that an actuation of the at least one input device during the training session is communicated to the computer system without moving the at least one productive device.

13. The mobile vehicle of claim 12, wherein the interactive training session may be presented in a plurality of languages.

14. The mobile vehicle of claim 12, wherein the interactive training session is activated by positioning a key of the mobile vehicle in an accessory position.

15. The mobile vehicle of claim 12, wherein the traction device includes a track system having an endless track, the at least one productive member corresponds to a blade, the training session includes at least one training session about a general operation of the mobile vehicle, and the chassis includes a first portion and a second portion which are moveably coupled about an articulating joint.

16. The mobile vehicle of claim 15, further comprising three additional traction devices.

17. A method of training an operator of a mobile vehicle, comprising the steps of:
providing a mobile vehicle including a chassis, a traction device adapted to contact the ground and propel the chassis, a power device, and a drive device being coupled to the power device and the traction device to provide power to the traction device, the mobile vehicle further including at least one productive device which is operable to perform at least a first task through at least one input device;
providing an interactive computer system coupled to the mobile vehicle, the interactive computer system communicating with the at least one input device to evaluate an actuation of the at least one input device, the interactive computer system including a training program to train the operator;
selecting the training program; and
disabling the at least one productive device during the training program while retaining communication between the at least one input device and the interactive computer system such that the interactive computer system evaluates the actuation of the at least one input device during the training program.

18. The method of claim 17, wherein the training program provides training on the first task in response to a request for training one the first task.

19. The method of claim 18, wherein the training program presents the training on the first task in response to an operator actuating the at least one input device.

20. The method of claim 17, wherein the training program is activated by placing a key into a keyway of the mobile vehicle and turning the key to an accessory position.

21. The method of claim 17, wherein the training program includes at least one of a general training mode, a specific operation training mode, and a input device training mode, wherein the general training mode presents training information on a general operation of the mobile vehicle, the specific operation training mode presents information on a specific task to be performed with the at least one productive device, and the input device training mode presents training information on a first one of the at least one input devices.

22. The method of claim 21, wherein the training program includes the general training mode, the specific operation training mode, and the input device training mode.

23. The method of claim 17, further comprising the steps of:
   wirelessly communicating an indication of the completion of the training program to a remote device; and
   storing a record of the completion of the training program.

24. A method of training an operator of a mobile vehicle, comprising the steps of:
   providing a mobile vehicle, the mobile vehicle including at least one productive device, an input device which is actuatable to control the at least one productive device, and an interactive training program in communication with the input device to train an operator of the mobile vehicle;
   operating the interactive training program by requesting an actuation of the input device; and disabling the at least one productive device during the training program such that the actual actuation of the input device during the training program does not move the productive device and determining whether an actual actuation of the input device communicated from the input device corresponds with the requested actuation of the input device.

25. The method of claim 24, further comprising the step of wirelessly sending an update to the training program to the mobile vehicle.

26. The method of claim 24, wherein the training program includes at least one of a general training mode, a specific operation training mode, and an input device training mode, wherein the general training mode presents training information on a general operation of the mobile vehicle, the specific operation training mode presents information on a specific task to be performed with the at least one productive device of the mobile vehicle, and the input device training mode presents training information on the input device of the mobile vehicle.

27. The method of claim 24, further comprising the steps of:
   wirelessly communicating an indication of a completion of the training program to a remote device; and
   storing a record of the completion of the training program.

* * * * *